(12) United States Patent
Park et al.

(10) Patent No.: US 8,229,055 B2
(45) Date of Patent: Jul. 24, 2012

(54) TOP NOZZLE FOR NUCLEAR FUEL ASSEMBLY

(75) Inventors: Joon-kyoo Park, Daejeon (KR); Joon-hyung Choi, Daejeon (KR); Kyu-Tae Kim, Daejeon (KR); Jung-min Suh, Daejeon (KR); Shin-ho Lee, Daejeon (KR); Nam-gyu Park, Daejeon (KR); Kyong-bo Eom, Daejeon (KR); Jin-sun Kim, Daejeon (KR); Jin-seok Lee, Daejeon (KR); Seong-ki Lee, Daejeon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 944 days.

(21) Appl. No.: 11/970,884

(22) Filed: Jan. 8, 2008

(65) Prior Publication Data

US 2010/0166134 A1 Jul. 1, 2010

(30) Foreign Application Priority Data

Aug. 27, 2007 (KR) ........................ 10-2007-0086023

(51) Int. Cl.
*G21C 15/00* (2006.01)
(52) U.S. Cl. ........................................ 376/364; 376/362
(58) Field of Classification Search .................. 376/364
See application file for complete search history.

(56) References Cited

U.S. PATENT DOCUMENTS

| 4,670,213 | A | * | 6/1987 | Wilson et al. | 376/446 |
| 4,762,676 | A | * | 8/1988 | Gjertsen et al. | 376/443 |
| 5,200,142 | A | * | 4/1993 | DeMario et al. | 376/446 |
| 5,671,261 | A | * | 9/1997 | Frederickson | 376/446 |
| 6,738,447 | B1 | * | 5/2004 | Sparrow et al. | 376/285 |

* cited by examiner

*Primary Examiner* — Ricardo Palabrica
(74) *Attorney, Agent, or Firm* — Rabin & Berdo, P.C.

(57) ABSTRACT

The present invention relates to a top nozzle for a nuclear fuel assembly that has a two-stage elastic section such that a pushing force against the axial movement of the nuclear fuel assembly under normal conditions is optimized and at the same time a suppressing force against a drastic uplifting force of the nuclear fuel assembly under transient conditions is strengthened, and that lowers the elastic coefficients of the springs operating under normal conditions more than those of existing coil springs, thereby providing an optimal pushing force against the nuclear fuel assembly.

1 Claim, 6 Drawing Sheets

【Fig 1】 (Prior Art)
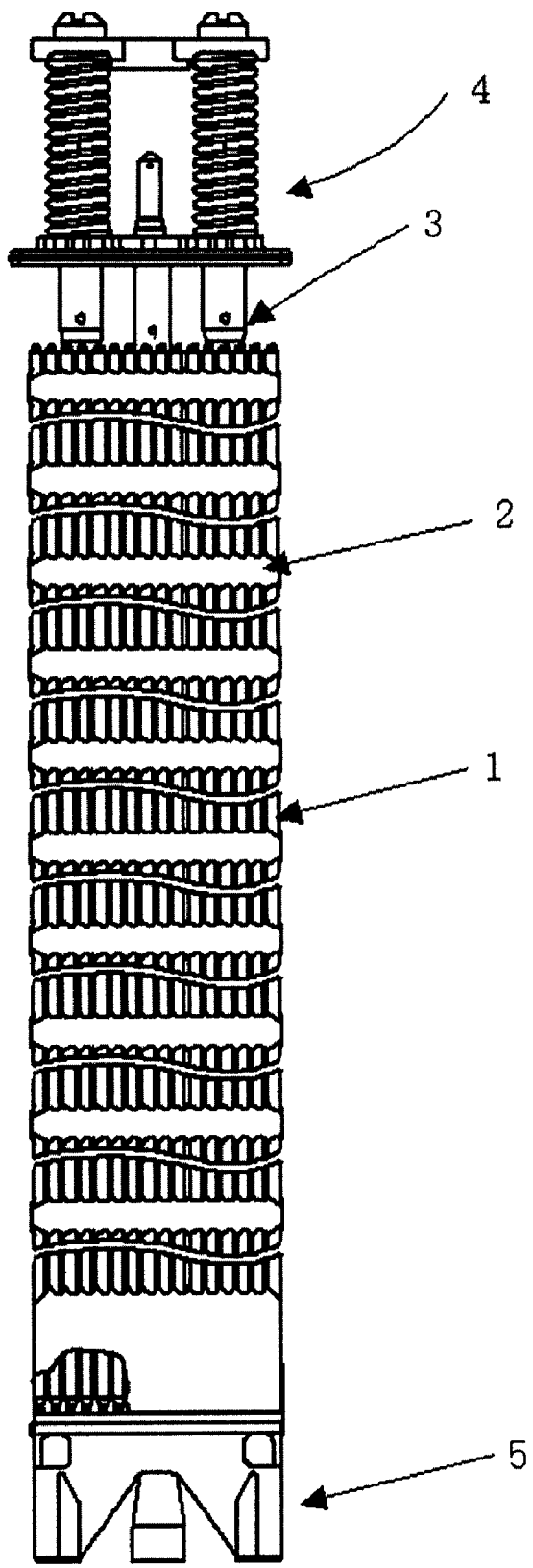

[Fig 2] (Prior Art)
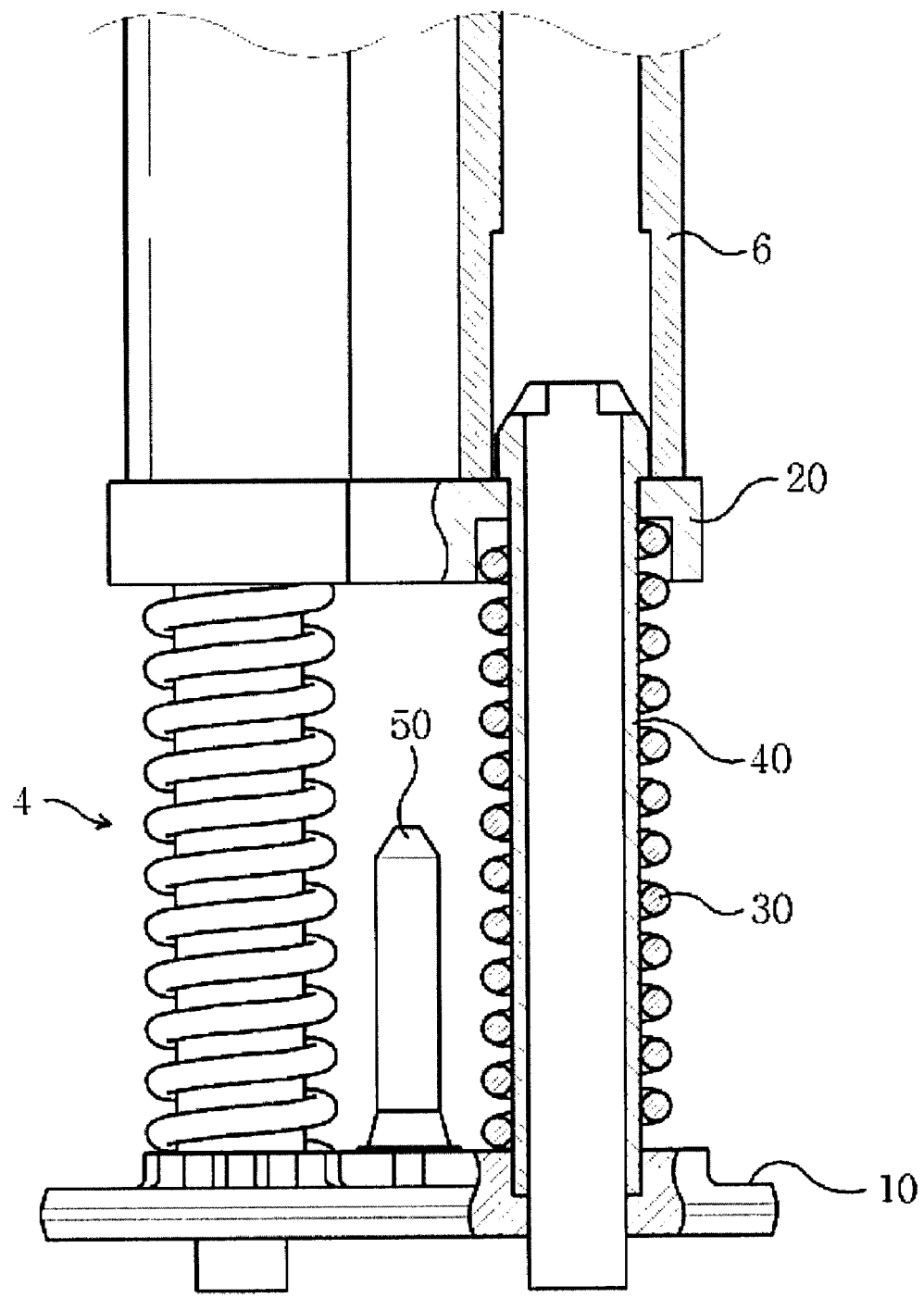

[Fig 3a]
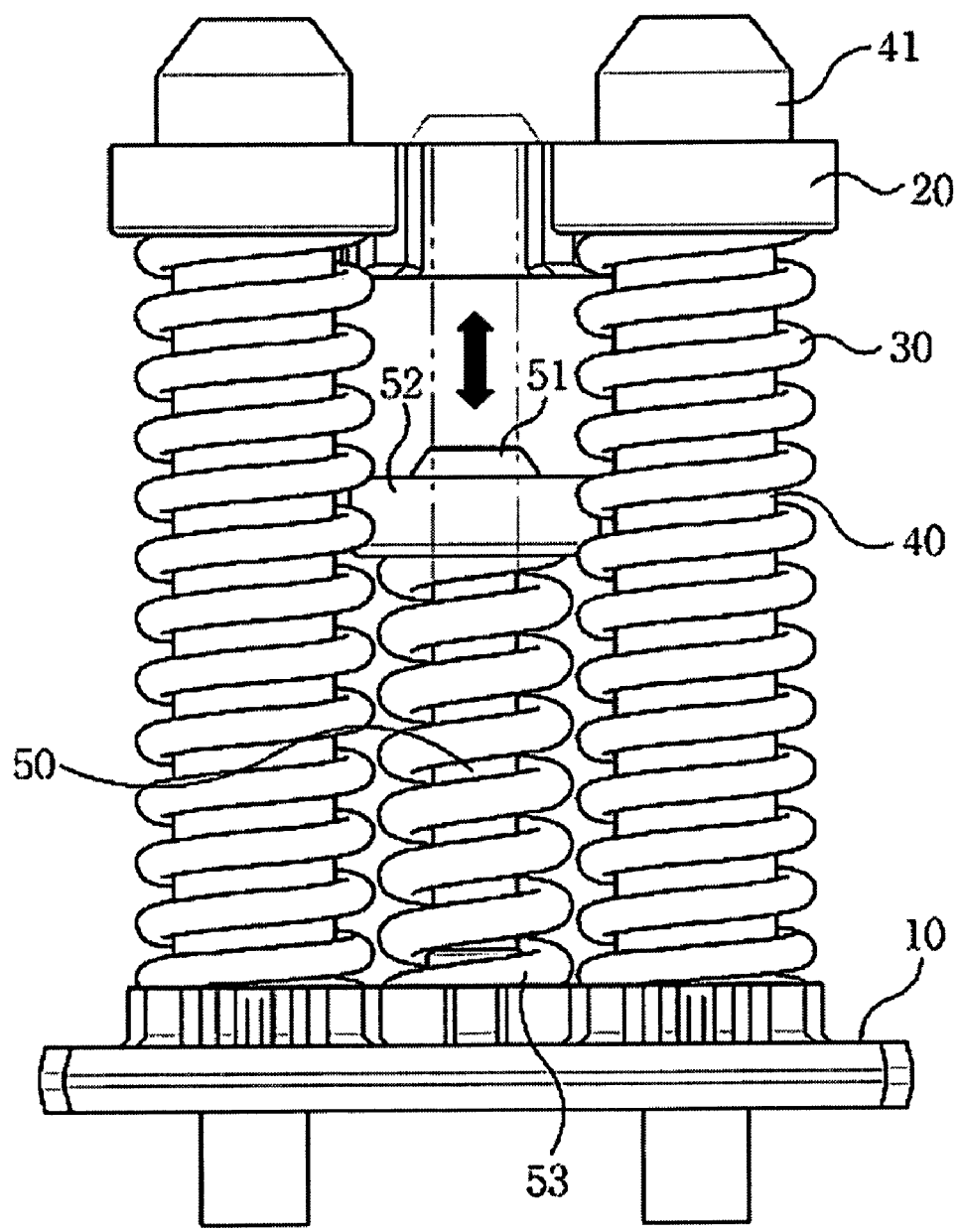

[Fig 3b]
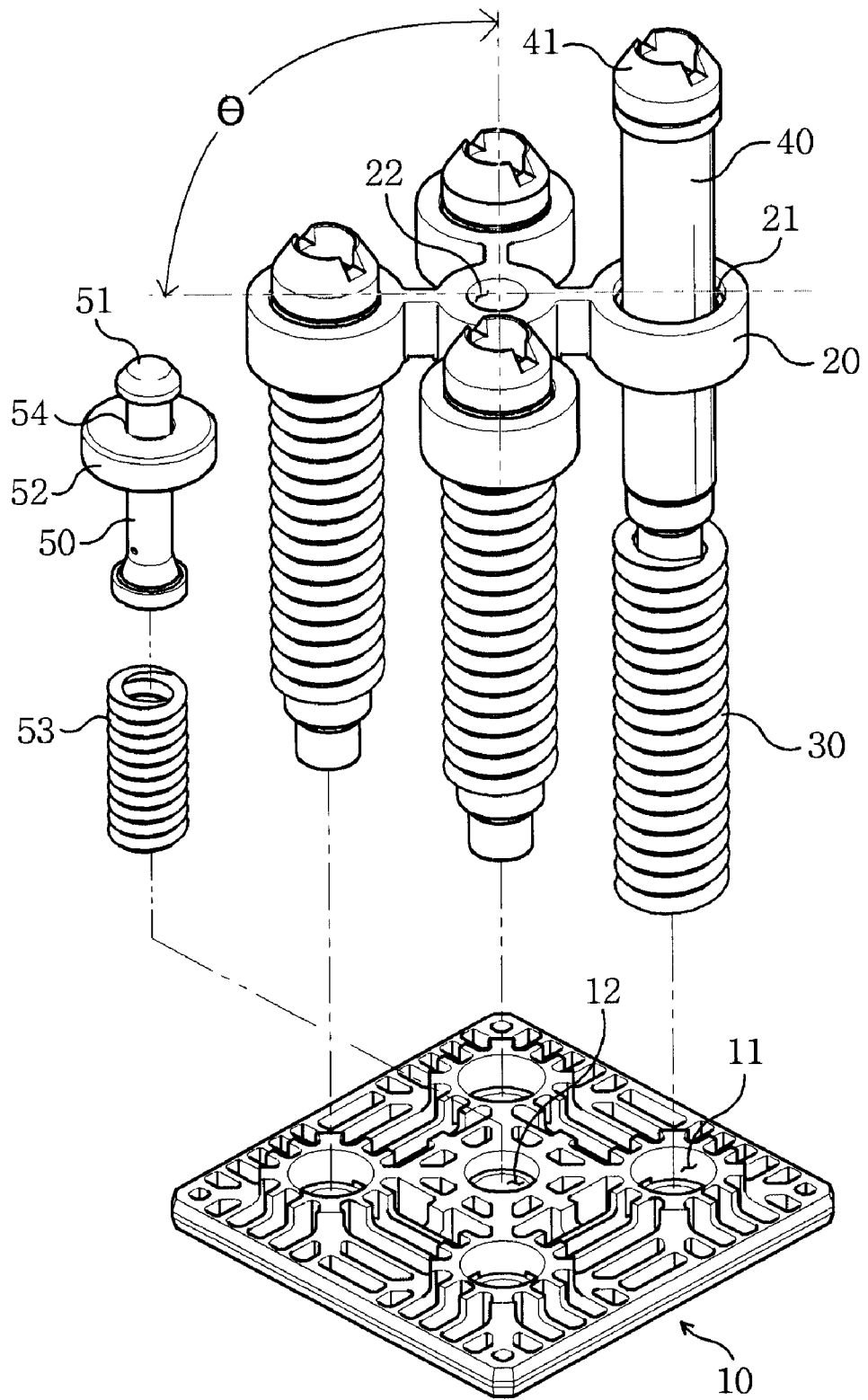

[Fig 4]
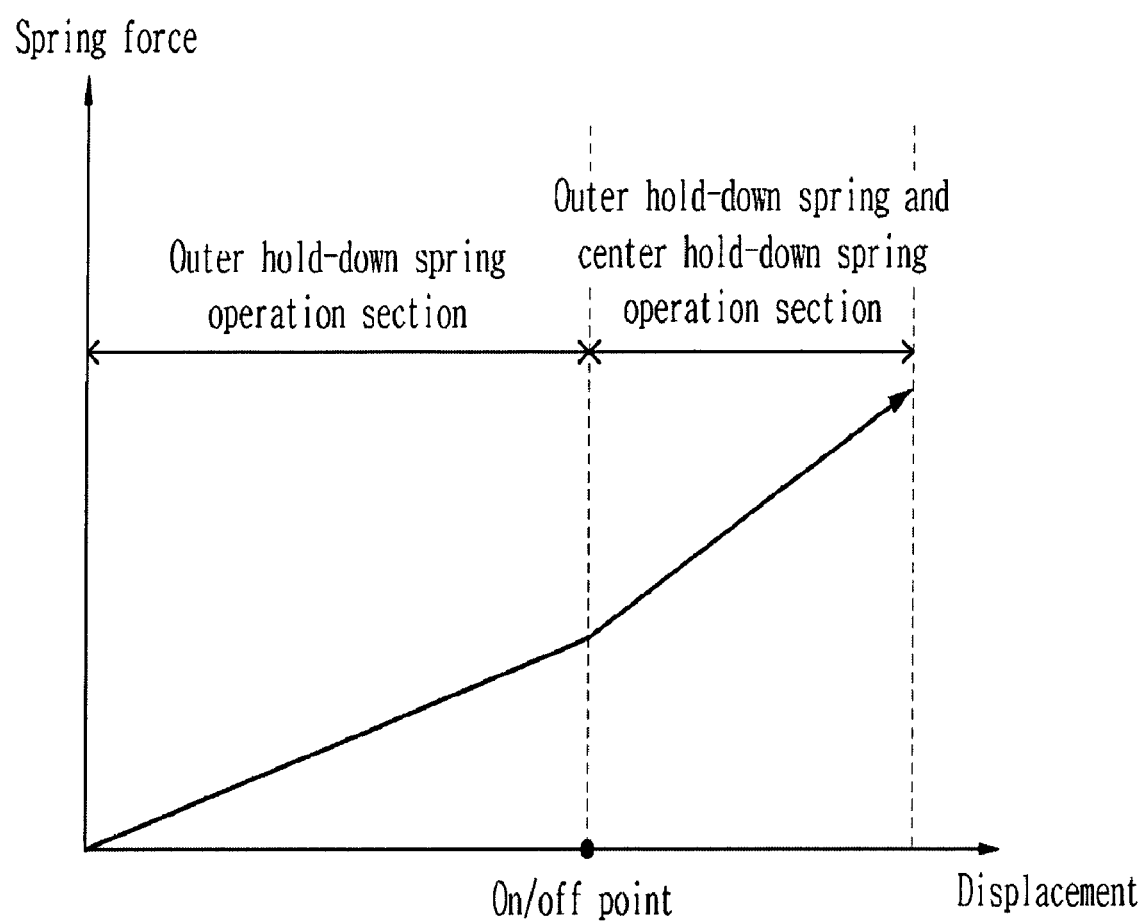

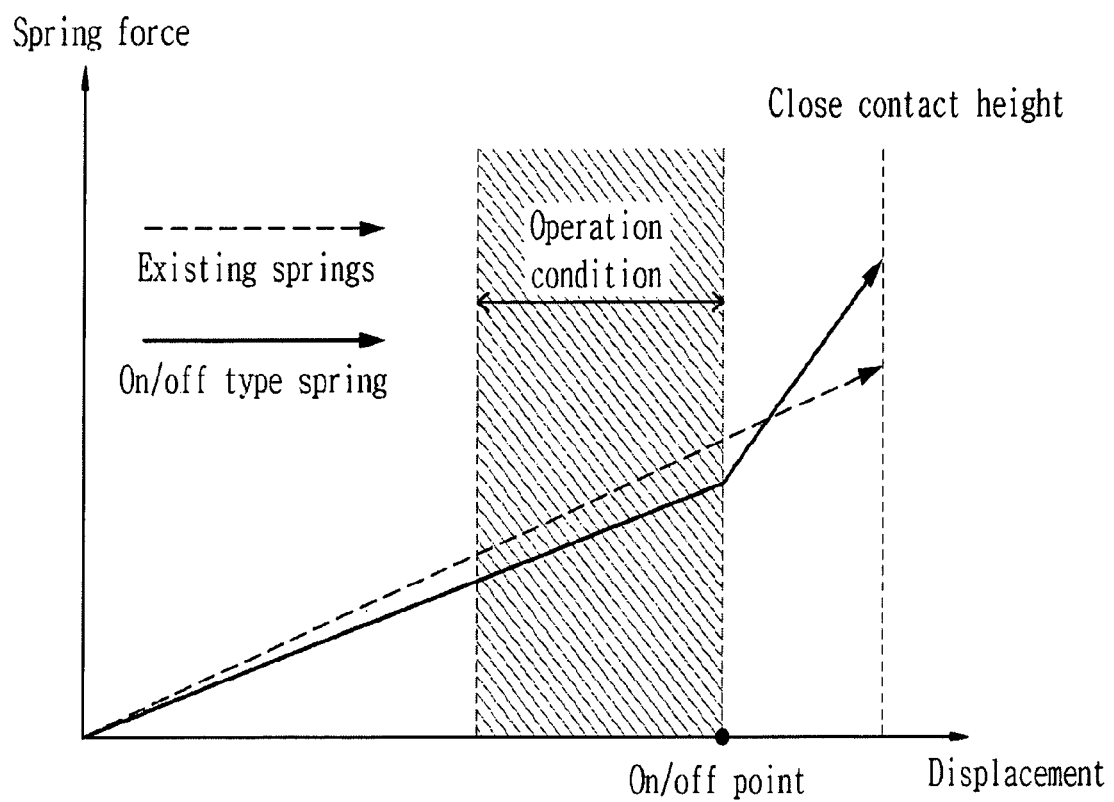
[Fig 5]

TOP NOZZLE FOR NUCLEAR FUEL ASSEMBLY

BACKGROUND OF THE INVENTION

1. Field of the Invention

The present invention relates to a top nozzle having on-off hold-down springs for a nuclear fuel assembly used in a nuclear reactor, thereby preventing the uplifting of the nuclear fuel assembly, and more particularly, to a top nozzle having on-off hold-down springs for a nuclear fuel assembly that has a two-stage elastic section such that a pushing force against the axial movement of the nuclear fuel assembly under normal conditions is optimized and at the same time a suppressing force against a drastic uplifting force of the nuclear fuel assembly under transient conditions is strengthened.

2. Background of the Related Art

A nuclear reactor is a device that artificially controls the chain reaction of the nuclear fission of fissile materials, thereby achieving a variety of use purposes such as the generation of heat, the production of radioisotopes and plutonium, the formation of radiation fields, or the like.

Generally, enriched uranium that is obtained by raising a ratio of uranium-235 to a range between 2% and 5% is used in a light water nuclear reactor. The uranium is molded to a cylindrical pellet having a weight of 5 g and is processed to a nuclear fuel used in the nuclear reactor. Numerous pellets are piled up to form hundreds of pellet bundles and then put into a cladding tube made of Zircaloy being at a vacuum state. After that, a spring and a helium gas are put thereinto, and a top end closure stopper is welded thereon, thereby making a fuel rod. The fuel rod is finally surrounded by a nuclear fuel assembly and then burnt up within the nuclear reactor through nuclear reaction.

The nuclear fuel assembly and the parts therein are shown in FIG. 1. FIG. 1 is a schematic view showing a general nuclear fuel assembly.

Referring to FIG. 1, the nuclear fuel assembly includes a skeleton comprised of a top nozzle 4, a bottom nozzle 5, guide thimbles 3, and a plurality of spacer grids 2, and a plurality of fuel rods 1 inserted longitudinally into an organized array by the spacer grids 2 spaced along the length thereof in such a manner as to be supported by means of springs (which are not shown) and dimples (which are not shown) disposed within the spacer grids 2. So as to prevent the formation of the scratches on the fuel rods 1 and the generation of the damage on the springs within the spacer grids 2 upon assembling the nuclear fuel assembly, thereafter, the fuel rods 1 have a locker applied thereon and are then inserted longitudinally into the skeleton of the nuclear fuel assembly. Next, the top and bottom nozzles are secured to the opposite ends of the nuclear fuel assembly, thereby finishing the assembling procedure of the nuclear fuel assembly. Then, after the locker of the finished assembly is removed, the distances between the fuel rods 1, the distortion of the nuclear fuel assembly, the total length thereof, and the dimension thereof are checked out, thereby finishing the manufacturing procedure of the nuclear fuel assembly.

Next, an explanation on the structure of the top nozzle 4 will be given with reference to FIG. 2, wherein the top nozzle 4 has a hold-down plate 20, a plurality of outer hold-down springs 30, a plurality of outer guide-tubular sleeves 40, a flow plate 10, and a center guide-tubular sleeve 50. Each of the outer guide-tubular sleeves 40 of the top nozzle 4 is connected at the lower portion thereof to each guide thimble 3 (see FIG. 1) of the skeleton and connected at the upper portion thereof to each insertion tube 6 in the reactor, thereby firmly fixing the nuclear fuel assembly in the reactor and ensuring the structural stability during the burn-up of the nuclear fuel.

In more detail, the nuclear fuel assembly receives a hydraulic uplift force generated by the coolant flow during the reactor operation, such that it is floated or vibrated. Further, the thermal expansion due to the temperature rising, the irradiation growth of the nuclear fuel guide thimbles due to the neutron irradiation for a long period of time, and the variation of the axial direction length by creeps are generated in the nuclear fuel assembly. Therefore, the mechanical and structural stability of the nuclear fuel assembly against the axial direction movements and the length variations thereof should be ensured, which is achieved by the top nozzle 4, specifically the outer hold-down springs 30 of the top nozzle 4.

In accordance with the designed shapes of the nuclear fuel assembly, there are provided several kinds of hold-down springs. Such the hold-down coil springs as shown in FIG. 2 are adopted in standard nuclear fuel assemblies generally used in Korea. Since the hold-down coil springs have a feature of operating only in an elastic section thereof, they should be designed to satisfy the elastic limits thereof.

The hold-down coil springs in the nuclear reactor ensure their elastic section under generally expected operation conditions, that is, under normal conditions, and if the uplift force is generated within the elastic section, the hold-down coil springs have to have a minimum elastic coefficient capable of gently absorbing the generated uplift force, thereby preventing the fuel rods from being bent or distorted due to the deviation of the nuclear fuel assembly from its original position. On the other hand, under transient conditions, that is, if a drastic uplift force is generated, the hold-down coil springs should have a predetermined elastic coefficient such that they are not compressed below their close contact height (at which the springs are not pressed anymore since no space between the coils of the springs exists).

In the conventional top nozzle having the hold-down coil springs, if the elastic coefficients of the springs are much lowered, the fuel rods are not sufficiently protected due to the limitation to the close contact height under the transient conditions, and contrarily, if the elastic coefficients of the springs are much raised, the springs are not elastically moved relative to the uplift force of the nuclear fuel assembly, thereby causing the fuel rods to be bent or damaged. Therefore, it is difficult to provide the springs having the elastic coefficient satisfying that the above-mentioned conditions.

Therefore, there is a need for the development of the top nozzle having the springs providing a minimum hold-down force requested under normal operation conditions and at the same time easily satisfying the limitation to the close contact height and the allowable stress reference.

SUMMARY OF THE INVENTION

Accordingly, the present invention has been made in view of the above-mentioned problems occurring in the prior art, and it is an object of the present invention to provide a top nozzle having on-off hold-down springs for a nuclear fuel assembly that is capable of preventing the nuclear fuel assembly from being bent by the generation of the excessive hold-down force under normal conditions.

It is another object of the present invention to provide a top nozzle having on-off hold-down springs for a nuclear fuel assembly that is capable of providing a separate elastic force under transient conditions, in addition to the elastic forces of the springs operating under normal conditions.

To accomplish the above objects, according to the present invention, there is provided a top nozzle having on-off hold-down springs for a nuclear fuel assembly, the top nozzle being connected to guide thimbles and an instrumentation tube of the nuclear fuel assembly at the lower end portion thereof and to insertion tubes of a reactor at the upper end portion thereof, thereby fixing the nuclear fuel assembly to the reactor, the top nozzle including: a hold-down plate having a center hole formed at the center thereof and a plurality of outer holes formed along the outer edge thereof, the plurality of outer holes being spaced apart by a given distance from the center hole thereof and having a given center angle; a flow plate having a center hole formed at the center thereof and a plurality of outer holes formed along the outer edge thereof, the plurality of outer holes being spaced apart by a given distance from the center hole thereof and having a given center angle, such that the distance between each outer hole and the center hole of the flow plate is the same as between each outer hole and the center hole of the hold-down plate; a plurality of outer guide-tubular sleeves each adapted to be inserted from the upper portion of each outer hole of the hold-down plate, passed through each outer hole of the flow plate, and connected to each guide thimble of the nuclear fuel assembly, each of the outer guide-tubular sleeves having a hold-down plate-locking part disposed at the top end thereof, the hold-down plate-locking part having a larger diameter than the diameter of each outer hole of the hold-down plate; a plurality of outer hold-down springs each disposed around the outer periphery of each outer guide-tubular sleeve between the hold-down plate and the flow plate, the outer hold-down spring being supported by the outer guide-tubular sleeve and providing a given elastic force between the hold-down plate and the flow plate; a center hold-down plate having a through-hole formed longitudinally therethrough; a center guide-tubular sleeve adapted to be inserted from the upper portion of the center hold-down plate and fastened to the center hole of the flow plate; and a center hold-down spring disposed around the outer periphery of the center guide-tubular sleeve between the center hold-down plate and the flow plate, the center hold-down spring being supported by the center guide-tubular sleeve and providing a given elastic force between the center hold-down plate and the flow plate.

Therefore, the top nozzle of the present invention can lower the elastic coefficients of the springs operating under normal conditions more than those of existing coil springs, thereby providing an optimal hold-down force against the nuclear fuel assembly, and further, can provide an appropriate hold-down force in response to the variation of the length of the nuclear fuel assembly, thereby stably fixing the position of the nuclear fuel assembly and further preventing the nuclear fuel assembly from being bent.

Additionally, the top nozzle of the present invention can provide a relatively strong hold-down force when compared with the conventional top nozzles, thereby ensuring the mechanical and structural stability of the nuclear fuel assembly.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a schematic view showing a structure of a general nuclear fuel assembly;

FIG. 2 is a longitudinal sectional view showing a conventional top nozzle of the nuclear fuel assembly;

FIG. 3a is a front view showing a top nozzle for a nuclear fuel assembly according to the present invention;

FIG. 3b is an exploded perspective view showing the top nozzle for a nuclear fuel assembly according to the present invention;

FIG. 4 is a graph showing the elastic sections of the springs of the top nozzle of the present invention; and FIG. 5 is a graph showing the comparison of elastic coefficients in elastic sections between the springs of the top nozzle of the present invention and the springs of the conventional top nozzle.

DETAILED DESCRIPTION OF THE PREFERRED EMBODIMENT

Hereinafter, an explanation on a top nozzle having on-off hold-down springs for a nuclear fuel assembly according to the present invention will be given with reference to the attached drawings. In the following description, it is to be understood that such terms as "top", "bottom", "left", "right", and the like are words of convenience, based upon the states shown in the drawings, and are not to be construed as limiting terms.

Referring to FIG. 3a, the top nozzle for the nuclear fuel assembly according to the present invention basically includes a hold-down plate 20, a flow plate 10, a plurality of outer guide-tubular sleeves 40, a plurality of outer hold-down springs 30, a center hold-down plate 52, a center guide-tubular sleeve 50, and a center hold-down spring 53.

An explanation on the hold-down plate 20 will be given with reference to FIG. 3b.

The hold-down plate 20 has a center hole 22 formed at the center thereof and four outer holes 21 formed along the outer edge thereof, the four outer holes 21 being spaced apart by a given distance from the center hole 22 and having a center angle θ of 90°.

The flow plate 10 has a center hole 12 formed at the center thereof and four outer holes 11 formed along the outer edge thereof, the four outer holes 11 being spaced apart by a given distance from the center hole 12 and having a center angle θ of 90°. At this time, the distance between each outer hole 11 and the center hole 12 on the flow plate 10 is the same as between each outer hole 21 and the center hole 22 of the hold-down plate 20.

Referring to FIG. 3b, the outer guide-tubular sleeves 40 are described.

Each outer guide-tubular sleeve 40 is extended to a predetermined length longitudinally. At the top end of each outer guide-tubular sleeve 40 is provided a hold-down plate-locking part 41 having a larger outer diameter than the inner diameter of each outer hole 21 of the hold-down plate 20. The outer guide-tubular sleeve 40 is inserted from the upper portion of each outer hole 21 of the hold-down plate 20 and is then passed through each outer hole 11 of the flow plate 10. After that, the outer guide-tubular sleeve 40 is connected to a guide thimble (which is not shown) of the nuclear fuel assembly.

An explanation on the outer hold-down spring 30 will be given with reference to FIG. 3b.

The outer hold-down spring 30 is formed of a hold-down coil spring and is disposed around the outer periphery of each outer guide-tubular sleeve 40 between the hold-down plate 20 and the flow plate 10. The hold-down spring 30 is supported by the outer guide-tubular sleeve 40 and provides a given elastic force between the hold-down plate 20 and the flow plate 10, if the flow plate 10 is lifted up.

An explanation on the center hold-down plate 52 will be given with reference to FIG. 3b.

The center hold-down plate 52 has a through-hole 54 formed longitudinally therethrough. At this time, the center hold-down plate 52 should have the larger outer diameter than the inner diameter of the center hole 22 of the hold-down plate 20.

Referring to FIG. 3b, the center guide-tubular sleeve 50 is described.

The center guide-tubular sleeve 50 is extended to a predetermined length longitudinally. At this time, the longitudinal length of the center guide-tubular sleeve 50 is shorter than that of the outer guide-tubular sleeve 40 and the difference between the lengths of the two sleeves causes an outer spring operation section. The center guide-tubular sleeve 50 is inserted from the upper portion of the center hold-down plate 52 and is fastened to the center hole 12 of the flow plate 10. At the top end of the center guide-tubular sleeve 50 is provided a center hold-down plate-locking part 51 having a smaller diameter than the diameter of the center hole 22 of the hold-down plate 20 and a larger diameter than the diameter of the through-hole 54 of the center hold-down plate 52.

Next, an explanation on the center hold-down spring 53 will be given with reference to FIG. 3b.

The center hold-down spring 53 is formed of a hold-down coil spring and is disposed around the outer periphery of the center guide-tubular sleeve 50 between the center hold-down plate 52 and the flow plate 10. The center hold-down spring 53 is supported by the center guide-tubular sleeve 50 and provides a given elastic force between the center hold-down plate 52 and the flow plate 10.

Hereinafter, an explanation on the operations and effects of the top nozzle for the nuclear fuel assembly will be given.

Referring to FIG. 3a, each of the outer guide-tubular sleeves 40 is coupled to the insertion tube 6, in the same manner as shown in FIG. 2, such that the nuclear fuel assembly is connected to the upper structure of the reactor, and the lower end of each outer guide-tubular sleeve 40 passed through the flow plate 10 is coupled to the guide thimble (not shown) of the skeleton, such that the skeleton and the fuel rods are fixed to the reactor.

Since each outer guide-tubular sleeve 40 is formed of a hollow cylinder, a control rod (which is not shown in the drawings) is passed through the insertion tube 6 (see FIG. 2) and the outer guide-tubular sleeve 40 and is then inserted into the guide thimble connected to the lower end of the outer guide-tubular sleeve 40.

In case where the nuclear fuel assembly is fixedly disposed in the reactor, the operations of the outer hold-down springs 30 and the center hold-down spring 53 will be described in detail.

The hold-down plate 20 functions to support the outer hold-down springs 30, together with the flow plate 10. Further, the flow plate 10 functions to transmit the axial direction force applied to the nuclear fuel assembly by the hydraulic uplift force during the operation of the reactor to the outer hold-down springs 30. At this time, the outer hold-down springs 30 provide a hold-down force through the elastic force against the axial direction vibration of the nuclear fuel assembly.

So as to explain the operations of the outer hold-down springs 30 and the center hold-down spring 53, it is assumed that the hydraulic uplift force is slowly increased. First, if the flow plate 10 is lifted up along the axial direction thereof by the hydraulic uplift force, the outer hold-down springs 30 start to be contracted. The section from the starting point where the outer hold-down springs 30 are contracted to the abutting point where the top end of the center hold-down plate 52 abuts against the lower end of the hold-down plate 20 is called an outer hold-down spring operation section. Referring to FIG. 4, that is, the section that reaches the on/off point along the displacement axis of the springs becomes the outer hold-down spring operation section. After that, if the uplift force is much increased, the center hold-down plate 52 is pressed against the lower end of the hold-down plate 20, such that the center hold-down spring 53 starts to be contracted. The section from the contraction of the center hold-down spring 53 to the contraction of the springs to a maximum contraction length is called an outer hold-down spring and center hold-down spring operation section. As shown in FIG. 4, that is, the section that is ranged over the on/off point along the displacement axis of the springs becomes the outer hold-down spring and center hold-down spring operation section. At this time, the elasticity of the outer hold-down springs 30 and the center hold-down spring 53 is added all, thereby providing the increased hold-down force. As shown in FIG. 4, that is, the four outer hold-down springs 30 are operated in the outer hold-down spring operation section, such that the size of the elasticity of the springs per the unit length of the displacement is not relatively large. However, the five springs are operated in the outer hold-down spring and center hold-down spring operation section, such that the size of the elasticity of the springs per the unit length of the displacement is relatively large.

The existing top nozzle having the hold-down springs of a single kind and the top nozzle having the hold-down springs according to the present invention are compared with each other, as shown in FIG. 5, when they are really applied upon the operation of the reactor. The cross-hatched section of the graph in FIG. 5 indicates generally expected spring displacement, that is, normal operation conditions. Under the normal operation conditions, the springs adopted in the present invention show smoother spring characteristics than the existing springs. If the nuclear fuel assembly is lifted up due to the drastic hydraulic raising, the operation conditions of the reactor reach the transient conditions. In this case, the existing springs still show constant inclination characteristics. However, the springs of the present invention show increased inclination characteristics and the spring features having a relatively strong hold-down force, since the five springs are operated together under the transient conditions.

Consequently, the springs adopted in the present invention have a relatively lower hold-down force than the existing springs, under the normal conditions, such that they can not give much load to the nuclear fuel assembly, and they have more increased hold-down force than the existing single kind of springs, under the transient conditions, such that they can appropriately protect the nuclear fuel assembly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A top nozzle for a nuclear fuel assembly, the top nozzle comprising:

a hold-down plate having a center hole formed at the center of the hold-down plate and a plurality of outer holes formed along an outer edge of the hold-down plate, the plurality of outer holes being spaced apart by a given distance from the center hold;

a flow plate having a center hole formed at the center of the flow plate and a plurality of outer holes formed along an outer edge of the flow plate, the plurality of outer holes of the flow plate being spaced apart by a given distance from the center hole of the flow plate such that the distance between each outer hole of the flow plate and the center hole of the flow plate is the same as the distance between each outer hole of the hold-down plate and the center hole of the hold-down plate;

a plurality of outer guide-tubular sleeves each adapted to be inserted from the upper portion of each outer hole of the hold-down plate, passed through each outer hole of the flow plate, each of the outer guide-tubular sleeves having a hold-down plate-locking part disposed at the top end of a corresponding outer guide-tubular sleeve of the outer guide-tubular sleeves, the hold-down plate-locking part having a larger diameter than the diameter of each outer hole of the hold-down plate;

a plurality of outer hold-down springs each disposed around the outer periphery of each outer guide-tubular sleeve of the plurality of outer guide-tubular sleeves between the hold-down plate and the flow plate, each of the plurality of outer hold-down springs being supported by a corresponding outer guide-tubular sleeve of the plurality of outer guide-tubular sleeves and providing a given elastic force between the hold-down plate and the flow plate;

a center hold-down plate having a through-hole formed longitudinally at the center of the center hold-down plate;

a center guide-tubular sleeve adapted to be inserted from the upper portion of the center hold-down plate and fastened to the center hold of the flow plate, wherein the longitudinal length of the center guide-tubular sleeve is shorter than that of each of the plurality of outer guide-tubular sleeves and the center guide-tubular sleeve has a center hold-down locking part having a smaller diameter than the diameter of the center hole of the hold-down plate and a larger diameter than the diameter of the through-hole of the center hold-down plate at the top end of the center guide-tubular sleeve; and a center hold-down spring disposed around the outer periphery of the center guide-tubular sleeve between the center hold-down plate and the flow plate, the center hold-down spring being supported by the center guide-tubular sleeve and providing a given elastic force between the center hold-down plate and the flow plate, wherein the plurality of outer hold-down springs and the center hold-down springs are on-off hold-down springs, wherein the outer hold-down springs provide hold-down force in response to variation of the length of the nuclear fuel assembly under normal operation conditions; and wherein the outer hold-down springs and the center hold-down spring provide hold-down force in response to variation of the length of the nuclear fuel assembly transient operation conditions.

* * * * *